United States Patent [19]

Beau

[11] 4,347,449
[45] Aug. 31, 1982

[54] PROCESS FOR MAKING A MAGNETIC ARMATURE OF DIVIDED STRUCTURE AND ARMATURE THUS OBTAINED

[75] Inventor: Jean-Francois Beau, Saint-Ouen l'Aumone, France

[73] Assignee: Societe Nationale Industrielle Aerospatiale, Paris, France

[21] Appl. No.: 127,830

[22] Filed: Mar. 6, 1980

[30]  Foreign Application Priority Data

Mar. 20, 1979 [FR] France ................................ 79 07021

[51] Int. Cl.³ ............................................ H02K 15/02
[52] U.S. Cl. ...................................... 310/42; 29/598; 310/43; 310/216
[58] Field of Search .......................... 29/605, 598, 596; 310/156, 261, 216, 218, 43, 42; 335/302, 297

[56]  References Cited

U.S. PATENT DOCUMENTS

| | | | |
|---|---|---|---|
| 2,484,214 | 10/1949 | Ford et al. | 29/605 |
| 2,810,085 | 10/1957 | Akeley | 29/598 X |
| 3,401,287 | 9/1968 | French et al. | 29/596 |
| 3,956,651 | 5/1976 | Brammerlo | 310/218 |

Primary Examiner—Carl E. Hall
Attorney, Agent, or Firm—Merriam, Marshall & Bicknell

[57]  ABSTRACT

The present invention relates to a process for making a magnetic armature of divided structure of annular shape and provided with a concentric annular groove, comprising the steps of winding a filamentary magnetic material on an annular mandrel, impregnating said winding with a hardening material, then cutting said winding along the equatorial plane of said mandrel, after said material has hardened. The invention is more particularly applicable to the production of divided magnetic armatures, especially for magnetic bearings.

9 Claims, 5 Drawing Figures

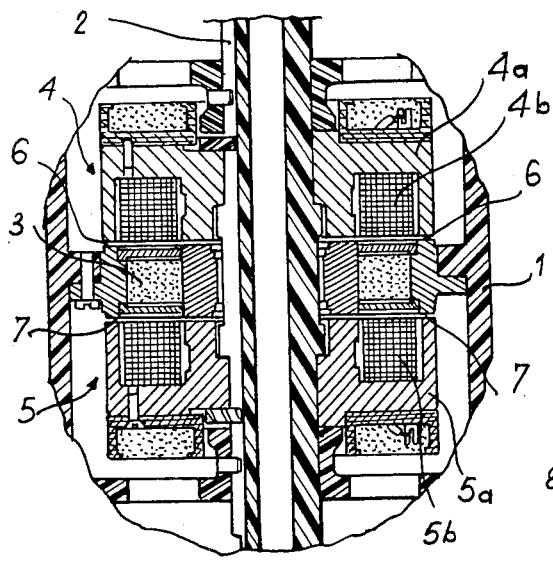
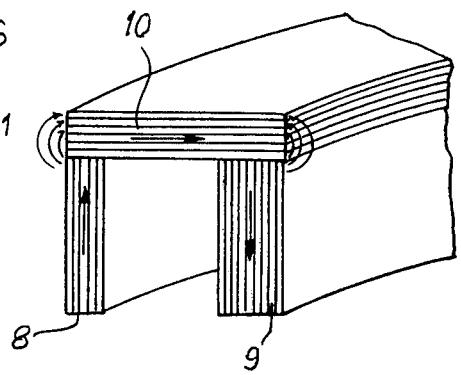
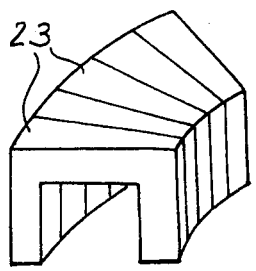
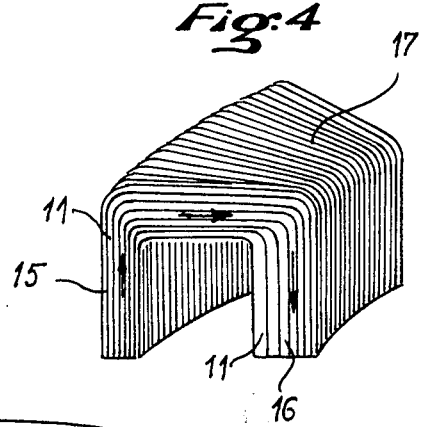
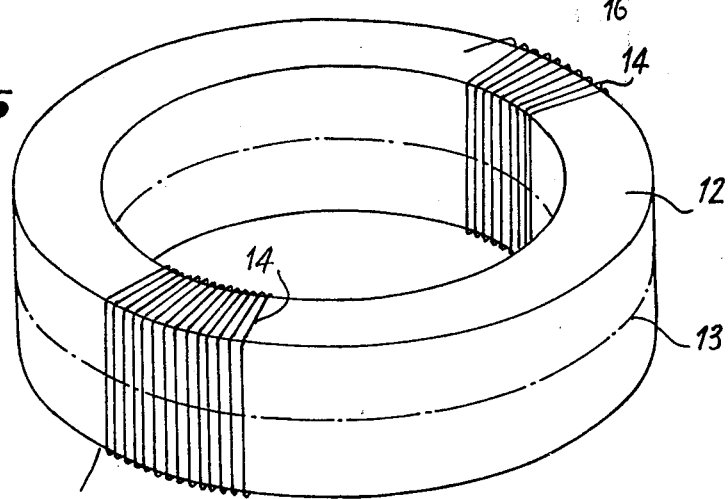

PROCESS FOR MAKING A MAGNETIC ARMATURE OF DIVIDED STRUCTURE AND ARMATURE THUS OBTAINED

The present invention relates to an armature of divided structure for an electromagnetic device and to a process for the manufacture thereof. It will be explained hereinafter more particularly with regard to its application to kinetic inertia wheels, but it is obvious that it is not limited to this application and that it may be carried out each time it is necessary to obtain armatures of high electromagnetic yield and of relatively small volume.

It is known that, to avoid the formation of eddy currents in the armatures of the electromagnetic devices and thus to increase their yield, it is necessary to divide these armatures and that it is usual to form them from thin blades which are insulated and superposed so as to give them a laminated structure. Such a laminated structure gives good results when the armature presents a simple, for example parallelepipedic shape, but, in the case of a complicated shape of the armature, the laminated structure often leads to relatively mediocre electromagnetic yields and is even impossible to make. This is the case for example of annular armatures comprising a concentric groove, with the result that the section of said armatures is at least approximately in the form of a U. Such annular armatures with concentric groove are relatively wide-spread and are found in particular in rotary electric machines, functioning either as a motor or as a generator and comprising a rotor forming kinetic inertia wheel. Such machines are currently called "kinetic wheels" and, due to their low weight and small dimensions, they are often used on board artificial satellites. The rotor of the kinetic wheels is generally mounted idly about its axis of rotation and its axial position on this axis or shaft is maintained due to a suspension with magnetic bearings which maintain air gaps of substantially constant width between the rotor and fixed pieces fast with said shaft, said air gaps being located in planes at right angles to said shaft. The rotor is therefore suspended between its air gaps. Such a suspension is relatively unstable and, for the width of the air gaps to remain constant, it is necessary to use electro-magnets of annular form which are disposed concentrically with respect to the axis of the rotor and whose supply current is regulated.

If it were desired to manufacture such an annular armature with concentric groove, giving it a laminated structure, the process for cutting, isolating and assembling the superposed sheets would be complicated. The least complicated process would be to form said armature by two concentric laminated rings making said groove therebetween, which would then be closed by a laminated flat ring connecting said concentric rings at one of their ends. However, this would result in a discontinuity in the lines of magnetic force between the concentric rings and said flat ring, this bringing about the formation of parasitic air gaps at this level and thus lowering the electromagnetic yield (cf. FIG. 2).

Another embodiment consists in forming the annular armature with concentric groove by juxtaposition of a plurality of identical sectors. However, such a process of manufacture is of high cost price, particularly due to the machining, insulation and assembling of the sectors. Moreover, the efficiency of the lamination thus obtained is relatively limited due to the thickness of the sectors which cannot easily be less than 1 mm (cf. FIG. 3).

Such an armature may also be made of moulded ferrite. However, in that case, with equal electromagnetic characteristics, the volume of the armature would be much greater since ferrite presents, at saturation, a magnetic induction which is much lower than the conventional ferromagnetic materials (4000 gauss for ferrite instead of 21,000 gauss for soft iron).

It is an object of the present invention to produce such an armature of divided structure having an optimal electromagnetic yield, not presenting any discontinuity in its lines of magnetic force, of small volume and of low cost.

To this end, according to the invention, the process for making a magnetic armature of divided structure presenting an annular shape and provided with a concentric groove, is noteworthy in that, on an annular mandrel of which at least a part of the section, disposed on one side of a plane at right angles to the axis of said mandrel, corresponds to the shape of said groove, a filamentary magnetic material is wound until a winding is obtained of which the part disposed on the same side of said plane corresponds at least approximately to the outer shape desired for said armature, after which said winding is impregnated with a hardening material capable of joining together the different turns of said winding, then, after said material has hardened, said winding is cut along said plane.

A divided armature is thus obtained, since it is constituted by sections of assembled wires, each having the approximate form of a U. The wound magnetic material may for example be soft iron wire and the wire used preferably comprises an outer, electrically insulating coating, in order to obtain good magnetic characteristics for the armature obtained. It may be made of pure iron wire coated with enamel. This wire may have a circular section. However, in order to obtain a good filling coefficient for the winding, the section of the wire may be square, rectangular or the like.

The mandrel used may be sawn at the same time as the winding and in this case, since it is disposable, it may be made of wood, wax, etc . . . On the other hand, the winding may be sawn so that the mandrel may be recuperated and, in this case, the latter is made for example of steel.

The mandrel is preferably symmetrical with respect to its equatorial plane, so that each winding gives two identical armatures after impregnation and cutting.

The impregnating material is advantageously insulating. It may be magnetic or non-magnetic and be constituted by a polymerisable resin such as epoxy resin.

Furthermore, due to the invention, it is possible to obtain identical effective sections for the inner and outer concentric annular parts of the armature according to the invention. To this end, in order to take into account the fact that, in a sector-shaped portion of the armature according to the invention, the inner annular part thereof is less wide circumferentially than the corresponding outer annular part, the radial thickness of the inner annular part is arranged to be greater than the radial thickness of this corresponding outer annular part, with the result that these outer and inner annular parts comprise the same number of turns.

Similarly, for the part of the armature according to the invention connecting said outer and inner concentric annular parts to present an effective section identical to that of the latter, it is advantageous to give the mandrel a shape such that the thickness of this connecting part is greater on the inner annular part side than on the outer annular part side.

The invention will be more readily understood on reading the following description with reference to the accompanying drawings, in which:

FIG. 1 is a view in partial section illustrating a magnetic suspension element for kinematic wheel, using armatures according to the invention.

FIGS. 2 and 3 illustrate known methods for obtaining a toric magnetic armature, with a concentric annular groove.

FIG. 4 shows, in perspective, a portion of the armature according to the invention.

FIGS. 5 and 6 illustrate the way in which the process according to the invention is carried out.

Figure 6:
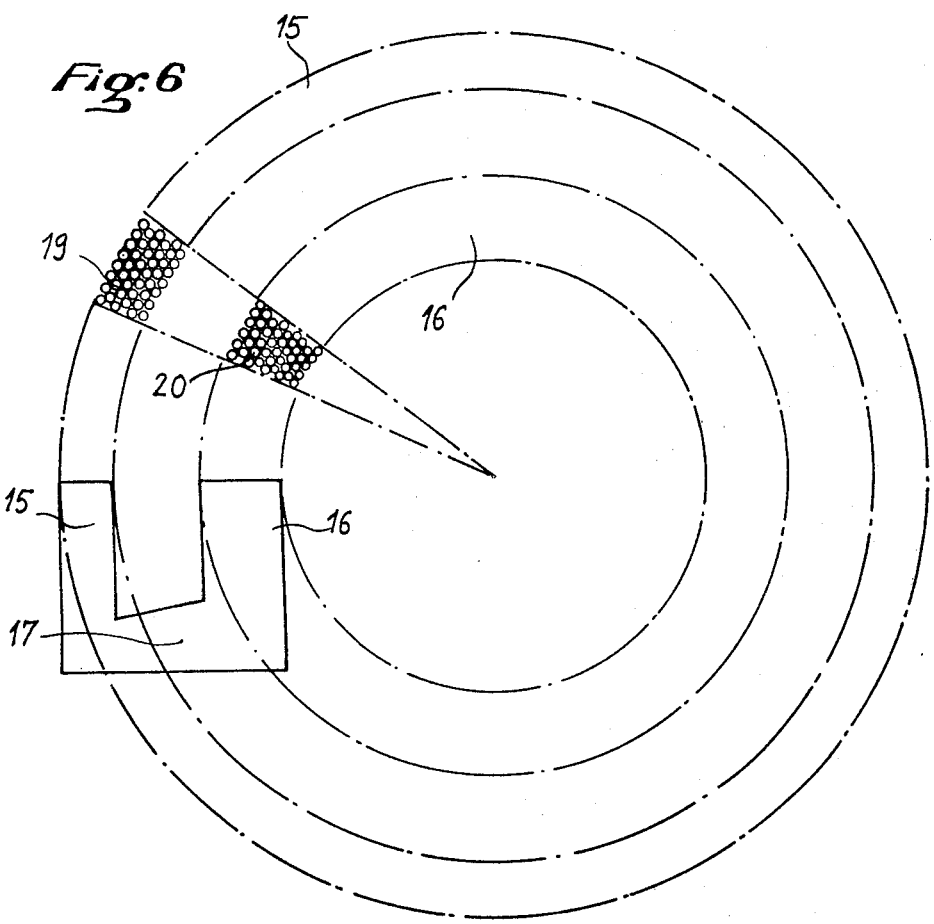

Referring now to the drawings, the portion of rotor 1, shown in FIG. 1, belongs to a kinetic wheel and the rotor 1 is idly mounted with respect to a shaft 2. The axial position of the rotor 1 with respect to said shaft 2 is defined by magnetic bearings comprising a magnetized ring 3 fast with the rotor 1 and concentric with respect to the shaft 2 on which it is centered, and two annular electromagnets 4 and 5, fast with the shaft 2 on which they are centred. The annular electromagnets 4 and 5 are disposed on either side of the magnetized ring 3, so as to make on each side thereof an air gap 6 or 7 for suspension.

Each electro-magnet 4 or 5 comprises an armature 4a or 5a of annular form and presents a concentric groove to house therein an electromagnetic coil 4b or 5b. It is an object of the present invention to make such an armature 4a or 5a.

FIG. 2 illustrates a known embodiment of a similar armature by means of two concentric laminated rings 8 and 9, connected by a likewise laminated flat ring 10. As has been mentioned hereinabove, such an embodiment is not satisfactory, particularly due to the discontinuity of the lines of force and the magnetic leaks which result therefrom at the join of the concentric rings 8 and 9 and the flat ring 10.

FIG. 3 illustrates another known embodiment, whereby substantially U-shaped segments 23 are juxtaposed. Such a method is expensive and does not allow a very thin lamination.

To remedy the drawbacks of these known methods, the present invention provides (cf. FIG. 4) producing such an armature by assembling a plurality of filamentary elements 11, each of which is in the form of a staple. The lines of magnetic force do not, in this case, suffer any discontinuity. The armature thus obtained then comprises two concentric rings, one outer ring 15, the other inner ring 16, connected by a flat ring 17.

To make an armature 4a or 5a having the filamentary structure of FIG. 4, an annular mandrel 12 is firstly made (cf. FIG. 5) whose section, on either side of its equatorial plane 13, corresponds to the form of the annular groove provided to house the coil 4b or 5b. A wire made of magnetic material is then wound on the mandrel 12 so as to form, in correspondence with the armature to be obtained, turns 14 which are juxtaposed and/or superposed, disposed in axial planes with respect to said mandrel. Once the winding is terminated, it is impregnated with a hardening magnetic or non-magnetic, insulating material and, after the material has hardened, the winding of the turns 14 is cut along the equatorial plane 13. Two filamentary armatures 4a or 5a are then obtained. These may be machined, for example, to make the necessary shoulders, recesses, etc . . .

The wire used to make the windings may be a pure iron wire of circular, square, rectangular or hexagonal section, insulated by a magnetic or non-magnetic, dielectric coating. The impregnating material may be a polymerisable resin such as epoxy resin.

Due to the invention, it is possible to obtain identical effective sections for the outer (15) and inner (16) concentric rings of the armature. As shown in FIG. 6, in a sector-shaped portion of the armature, the part 19 of the outer ring 15 is wider than the corresponding part 20 of the inner ring 16. For these parts 19 and 20 to present the same effective section, they comprise the same number of filamentary elements (45 in the example of FIG. 6). Furthermore, for the flat ring 17 likewise to present an effective section equal to that of parts 15 and 16, this ring may be provided to be thicker on the ring 16 side than on ring 15 side, by suitably shaping the mandrel 12.

Figure 7:
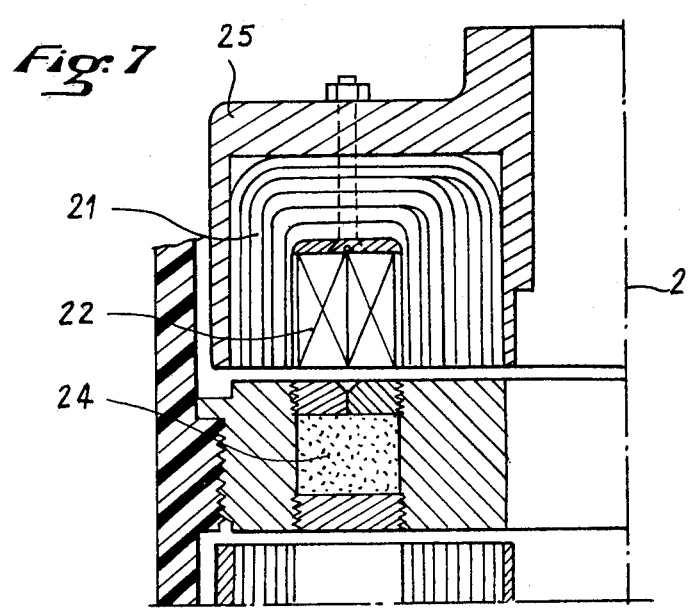
FIG. 7 shows the assembly of an armature according to the invention.

In FIG. 7, it has been shown that an armature 21 according to the invention, provided with its coil 22 and mounted in a magnetic bearing opposite a rotary magnetize ring 24 could, if necessary, be incorporated in an annular framework 25 for picking up effort.

I claim:

1. A process for forming a magnetic armature having an annular shape and a concentric annular groove defined in part by concentric inner and outer radial rings, said inner ring having a radial thickness greater than that of said outer ring, said process comprising the steps of:

winding a filamentary magnetic material on an annular mandrel having a cross-section on one side of a plane at right angles to the axis of said mandrel, which cross-section corresponds in part to the cross-sectional contour of said groove, to produce a toroidal winding having an outer shape on said side of said plane which at least approximately corresponds to the desired outer shape of said armature;

impregnating said winding with a hardenable material capable when hardened of joining together the turns of said winding;

hardening said material; and cutting said winding along said plane to form said armature.

2. A process of claim 1 wherein said mandrel varies in thickness, measured in a direction parallel to its axis, being greater at its end adjacent said outer ring than at its edge adjacent said inner ring.

3. A process as claimed in claim 1, wherein the filamentary material comprises a magnetic or non-magnetic, insulating coating.

4. A process as claimed in claim 1, wherein the section of the filamentary material is square, rectangular or hexagonal.

5. A process as claimed in claim 1, wherein the mandrel is symmetrical with respect to its equatorial plane so that each winding gives two identical armatures after impregnation and cutting.

6. A process as claimed in claim 1, wherein the impregnating material is magnetic or non-magnetic, insulating material.

7. The process of claim 5, wherein the impregnating material is a polymerisable resin.

8. A magnetic armature, obtained by carrying out the process as claimed in any one of claims 1, or 2-6.

9. An electromagnetic device and particularly a magnetic bearing, wherein it comprises an armature as claimed in claim 8.

* * * * *